United States Patent [19]
Lundborg

[11] Patent Number: 6,088,584
[45] Date of Patent: Jul. 11, 2000

[54] METHODS FOR CELLULAR PAY PHONE/ DEBIT PHONE SUPPORT ON ANALOG CHANNELS

[75] Inventor: Tomas Lundborg, Stockholm, Sweden

[73] Assignee: Telefonaktiebolaget LM Ericsson, Stockholm, Sweden

[21] Appl. No.: 08/826,793

[22] Filed: Mar. 25, 1997

Related U.S. Application Data

[63] Continuation-in-part of application No. 08/772,471, Dec. 23, 1996, abandoned.

[51] Int. Cl.$^7$ ..................................................... H04B 7/00
[52] U.S. Cl. ................................................ 455/406; 455/411
[58] Field of Search ............................ 455/406, 407, 455/408, 410, 411, 422, 423; 379/111, 112, 113, 114, 115

[56] References Cited

U.S. PATENT DOCUMENTS

| | | |
|---|---|---|
| 5,524,135 | 6/1996 | Mizikovsky et al. . |
| 5,577,100 | 11/1996 | McGregor et al. . |

FOREIGN PATENT DOCUMENTS

| | | |
|---|---|---|
| 647 055 | 4/1995 | European Pat. Off. . |
| 0651586A2 | 5/1995 | European Pat. Off. . |
| 0651586A3 | 5/1995 | European Pat. Off. . |
| WO95/20298 | 7/1995 | WIPO . |
| 96 09734 | 3/1996 | WIPO . |

OTHER PUBLICATIONS

R. Krayem–Nevoux et al., "Payphone Service for Third Generation Mobile Systems," *IEEE*, pp. 1708–1712, Nov. 29, 1993.
PCT Notification of Transmittal of International Search Report, Jun. 17, 1998.
International Search Report, Jun. 17, 1998.
EIA/TIA Interim Standard, IS–136.2–A, Mar. 1996, pertinent pages.
"Pay Phone Support in IS–136," Nov. 1995, pertinent pages.
EIA/TIA –IS–54–B, pertinent pages.
TACS Mobile Station–Land Station Compatibility Specification, Issue 4, pertinent pages.

*Primary Examiner*—Thanh Cong Le
*Attorney, Agent, or Firm*—Burns, Doane, Swecker & Mathis, L.L.P.

[57] ABSTRACT

A method for providing support for both Authentication and Privacy and sending charge rates to pay phones/debit phones on an analog channel in a communication system using mobile station control messages in a non-standard manner is disclosed. Each control message contains an Order Code, a Qualifier Code, and a Local/Message Type. A first group of combinations of Order Code, Qualifier Code, and Local/Message Type are assigned to Authentication and Privacy. A second group of combinations of Order Code, Qualifier Code and Message Type are assigned to sending the charge rates, wherein the first and second groups are mutually exclusive.

8 Claims, 6 Drawing Sheets

| INFORMATION ELEMENT | LENGTH (BITS) | | |
|---|---|---|---|
| $T_1T_2 = 10$ | 2 | | |
| SCC | 2 | | |
| SCC = 11 | | SCC ≠ 11 | |
| INFORMATION ELEMENT | LENGTH (BITS) | INFORMATION ELEMENT | LENGTH (BITS) |
| PSCC | 2 | PSCC | 2 |
| EF (=0) | 1 | EF (=0) | 1 |
| RSVD = 00000000/ DVCC | 8 | RSVD = 0...0 | 5 |
| LOCAL/MSG TYPE | 5 | PVI | 1 |
| ORDQ | 3 | MEM | 1 |
| ORDER | 5 | VMAC | 3 |
| P | 12 | CHAN | 11 |
| | | P | 12 |

FIG. 5

| ORDER CODE | QUAL CODE | MESSAGE TYPE | FUNCTION |
|---|---|---|---|
| (BASE STATION INITIATED MESSAGES ONLY - MOBILE STATION AUTHENTICATION AND PRIVACY) | | | |
| 10100 | 000 | 00000 | UNIQUE CHALLENGE ORDER |
| 10101 | 000 | 00000 | SSD UPDATE ORDER |
| 10110 | 000 | 00000 | DISABLE DTMF ORDER |
| 10111 | 000 | 00000 | MESSAGE ENCRYPTION MODE ORDER WITH DISABLE INDICATION |
| 10111 | 001 | 00000 | MESSAGE ENCRYPTION MODE ORDER WITH ENABLE INDICATION |

FIG. 6

ORDER AND ORDER QUALIFIER CODES

| ORDER CODE | ORDER QUALIFIER | FUNCTION |
|---|---|---|
| 00000 | ABC | PAGE (OR ORIGINATION) |
| 00001 | 000 | ALERT |
| 00010 | 000 | ANSWER |
| 00011 | 000 | LAND RELEASE |
| 00100 | 000 | REORDER |
| 00111 | ABC | AUDIT |
| 01000 | 000 | SEND CALLED-ADDRESS |
| 01001 | 000 | INTERCEPT |
| 01010 | 000 | MAINTENANCE |
| 01011 | 000 | CHANGE POWER TO POWER LEVEL 0 (SEE SECTION 2.1.2.2) |
| 01011 | 001 | CHANGE POWER TO POWER LEVEL 1 |
| 01011 | 010 | CHANGE POWER TO POWER LEVEL 2 |
| 01011 | 011 | CHANGE POWER TO POWER LEVEL 3 |
| 01011 | 100 | CHANGE POWER TO POWER LEVEL 4 |
| 01011 | 101 | CHANGE POWER TO POWER LEVEL 5 |
| 01011 | 110 | CHANGE POWER TO POWER LEVEL 6 |
| 01011 | 111 | CHANGE POWER TO POWER LEVEL 7 |
| 01100 | 000 | DIRECTED RETRY - NOT LAST TRY |
| 01100 | 001 | DIRECTED RETRY - LAST TRY |
| 01101 | 000 | REGISTRATION |
| 01110 | ABC | REGISTRATION - SWITCH ON |
| 01111 | ABC | REGISTRATION - FORCED |
| 11010 | ABC | REGISTRATION - PERIODIC |
| 101XY | NNN | CHARGE RATE (X, Y, N MAY BE 0 OR 1) |
| 11011 | 000 | MOBILE RELEASE |
| 00110 | 000 | STOP ALERT |
| 11101 | 000 | CALL QUEUED |
| 11110 | ABC | LOCAL CONTROL |

FOR MS_SUP_LEV_S = 01 OR HIGHER (ALL OTHER CODES ARE RESERVED)

FIG. 7

FIELD: ORDER LOCAL ORDQ
          X Y  NNN NO. OF BITS: 1 1   5   3
          MSB     LSB

FIG. 8

METHODS FOR CELLULAR PAY PHONE/ DEBIT PHONE SUPPORT ON ANALOG CHANNELS

This application is a continuation-in-part of application Ser. No. 08/772,471, filed on Dec. 23, 1996, now abandoned.

FIELD OF THE INVENTION

The present invention relates to a method and apparatus for providing both charge rate support and Authentication and Privacy for cellular pay phones and debit phones in a communications system on an analog channel.

BACKGROUND OF THE INVENTION

In the last ten years, there has been a rapid growth of industry and residences into rural and isolated areas. Thus, more people are having to spend more time in what used to be rural and isolated areas. Since there are more people in these areas now, there is now a need for additional telephone support in these areas. For example, there is a need for pay phones throughout these areas to allow people to make telephone calls. Pay phones are phones in which a user pays for the call using money or credit cards and they are usually placed in public areas. The cellular pay phones are fixedly installed but are connected via radio signals to a cellular system, thus the term cellular pay phone. Debit phones are regular cellular phones with a prepaid number of call credits. Debit phones are typically used in markets where fraud or the occurrence of people not paying their bills is prevalent. Typically, pay phones are connected to land line systems by telephone cables. However, it can be very expensive to run new land line cables to isolated or rural areas which did not previously have land line telephone service. In addition, the cellular provider may want to provide pay phones in areas in which the cellular provider does not have a land line system. Furthermore, the cellular provider may want to provide cellular pay phones on public transportation vehicles such as trains or buses.

Figure 1:
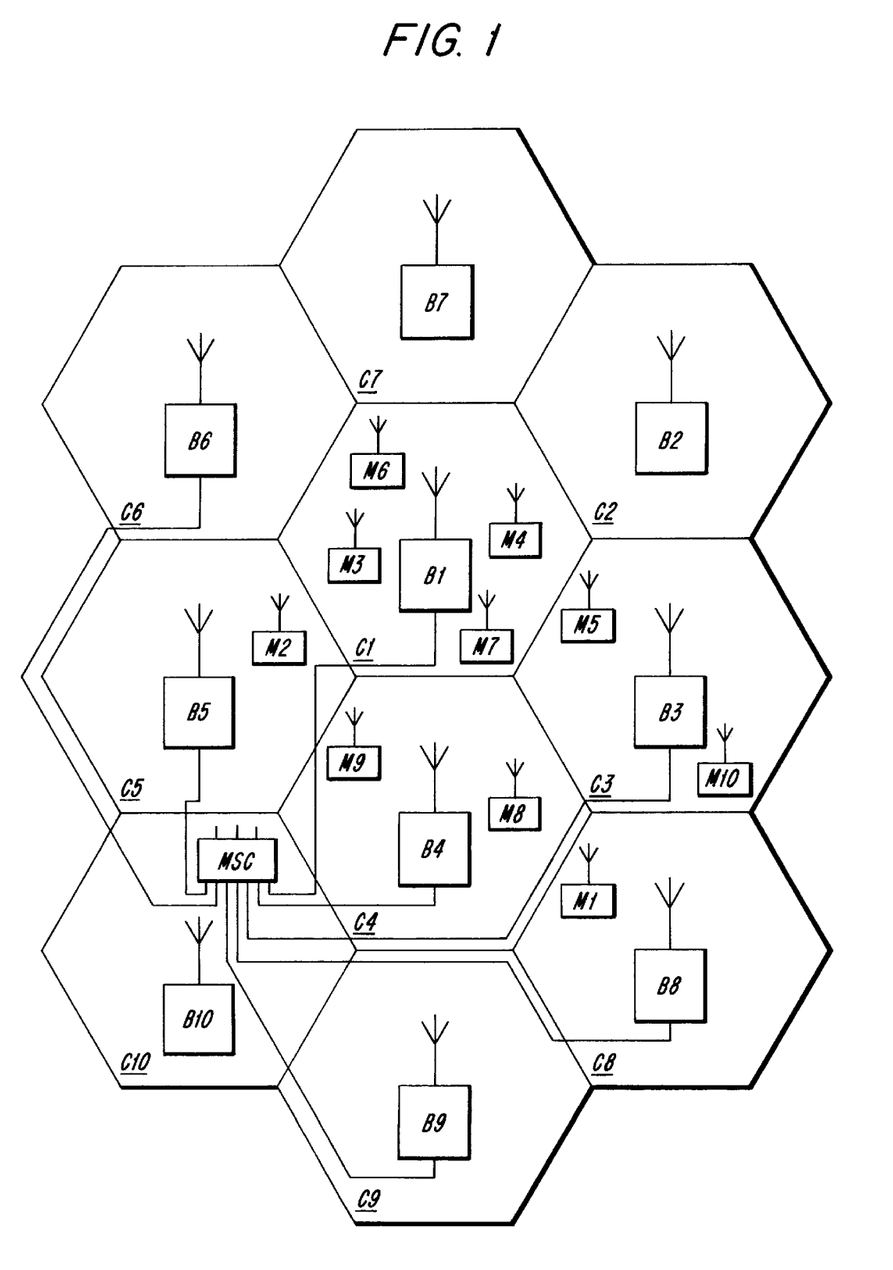
FIG. 1 illustrates a mobile telephony communication system.

FIG. 1 illustrates a cellular communication system which can provide support for cellular pay phones and debit phones. FIG. 1 illustrates 10 cells, C1–10, of a cellular radio system. For each cell, there is a corresponding base station B1–B10. Remote stations which can either be cellular pay phones, debit phones, or regular cellular phones are shown as M1–M10. Some of the remote stations may be moved within a cell and from one cell to another. A mobile switching center MSC is connected to all of the base stations by cables or other fixed means, like radio signals. The MSC is also connected by cables or links to a fixed public telephone network or a similar fixed communication network. The MSC communicates with the remote stations by sending signals or commands to the base stations wherein the base stations transmit and receive the appropriate signals to and from the remote stations.

For pay phone/debit phone service, the pay phone/debit phone needs to know what rate to charge during the call. This charge rate information can be provided in several ways. For example, in some systems, the pay phones/debit phones can have a chart of different charge rates which are selected by analysis of the called numbers. The problem with this arrangement is that every time the system operators change the rates, the chart stored in each pay phone/debit phone needs to be upgraded.

In other systems, the charge rate information can be sent to the pay phones/debit phones so that the user will know how much money to deposit into the machine or how much money is going to be charged to a credit or debit card for the call or how many monetary units will be removed from the prepaid amount in the debit phone. There is also a need for authenticating the users of a pay phone. If a user is not authenticated or a simple authentication algorithm is used, the pay phones may be cloned or calls hi-jacked enabling people to make calls without being charged. Some analog AMPS (Advanced Mobile Phone Service system) operators have introduced pay phones into their cellular networks using Charge Rate Order messages (CRO) to send the charge rate information to the pay phone/debit phone. However, Authentication and Privacy functions, e.g. Authentication, disabling DTMF, and enabling/disabling encryption, are no longer available. The Charge Rate Order is a standard function in the TACS system which happens to also work in AMPS systems but only as a non-standardized proprietary function. In some systems, the Charge Rate Order is based upon giving the mobile phones a special subscriber category (MCH) which differentiates them from ordinary cellular subscriptions. When a call is made and the mobile switching center detects that the called party has answered the call, the MSC checks the MCH category of the originating phone. If the category indicates that the mobile phone is indeed a pay phone/debit phone, the CRO function within the MSC sends a message to the pay phone/debit phone through the appropriate base station indicating that the called party has answered the call and which charge rate is to be used during the call.

However, there are several problems with using charge rate order functions. First of all, the Charge Rate Order is a standard TACS function only and is not standardized in AMPS systems. Furthermore, when Authentication and Privacy was introduced into AMPS systems, spare Order Codes were used for Authentication which happens to coincide with the Order Codes that the TACS Charge Rate Order uses. Thus, the Charge Rate Order message can no longer be used to send the charge rates in AMPS systems without disabling Authentication and Privacy.

As noted above, the TACS system provides a Charge Rate Order function. In addition, the TACS system provides an Authentication function. However, the Authentication function uses a simpler security algorithm and does not provide the same level of protection against cloning. Furthermore, the TACS system does not provide message encryption (enabling/disabling).

As noted above, the AMPS systems do not support Charge Rate Orders. It is not practicable to introduce a specific dedicated message for this function in the AMPS system for several reasons. First of all, it would require upgraded software not only in the mobile service centers and remote stations, but also in radio base stations. That is all old base stations where a pay phone is to be connected would have to be upgraded. Furthermore, a debit phone roaming into an area served by old, non-upgraded base stations, would not work. Furthermore, it takes time to standardize and implement new messages. Thus, there is a need for a solution where only the MSC software and the pay/debit phones need to be upgraded in order to provide appropriate cellular coverage without disabling the authentication capability.

SUMMARY OF THE INVENTION

It is an object of the present invention to overcome the problems cited above by providing a method and apparatus for providing pay/debit phone support in cellular communication systems by using existing methods (TACS Charge Rate Order and AMPS Authentication and Privacy) on the analog voice channel in a non-standard manner. The Charge Rate Order function is used as specified in TACS but without several Charge Rate Order codes which have been reserved for Authentication and Privacy. The Charge Rate Order or Authentication and Privacy functions include sending mobile station control messages to the mobile station.

According to one embodiment of the present invention, a method for providing support for Charge Rate Order and Authentication and Privacy functions for pay phones/debit phones in a communications system is disclosed which sends control messages between base stations and said pay phones/debit phones on an analog channel, wherein each control message contains an Order Code, a Qualifier Code, and a Local/Message Type. A first group of combinations of Order Code, Qualifier Code, and Local/Message Type is used to identify Authentication and Privacy, while the remaining combinations of Order Code, Qualifier Code and Local/Message Type are used according to TACS Charge Rate Order.

BRIEF DESCRIPTION OF THE DRAWINGS

These and other features and advantages of the invention will be readily apparent to one of ordinary skill in the art from the following written description, used in conjunction with the drawings, in which.

DETAILED DESCRIPTION

Although the description hereinafter focuses on systems which comply with TACS and IS-136 and its predecessors (IS-54B, EIA 553, etc.), the principles of the present invention are equally applicable to a variety of wireless communication systems. As will be appreciated by one skilled in the art, the logical channel which carries speech and/or data may be implemented in different ways at the physical layer level. For purposes of the present invention, the term "channel" means any physical channel which can carry speech and/or data.

Figure 2:
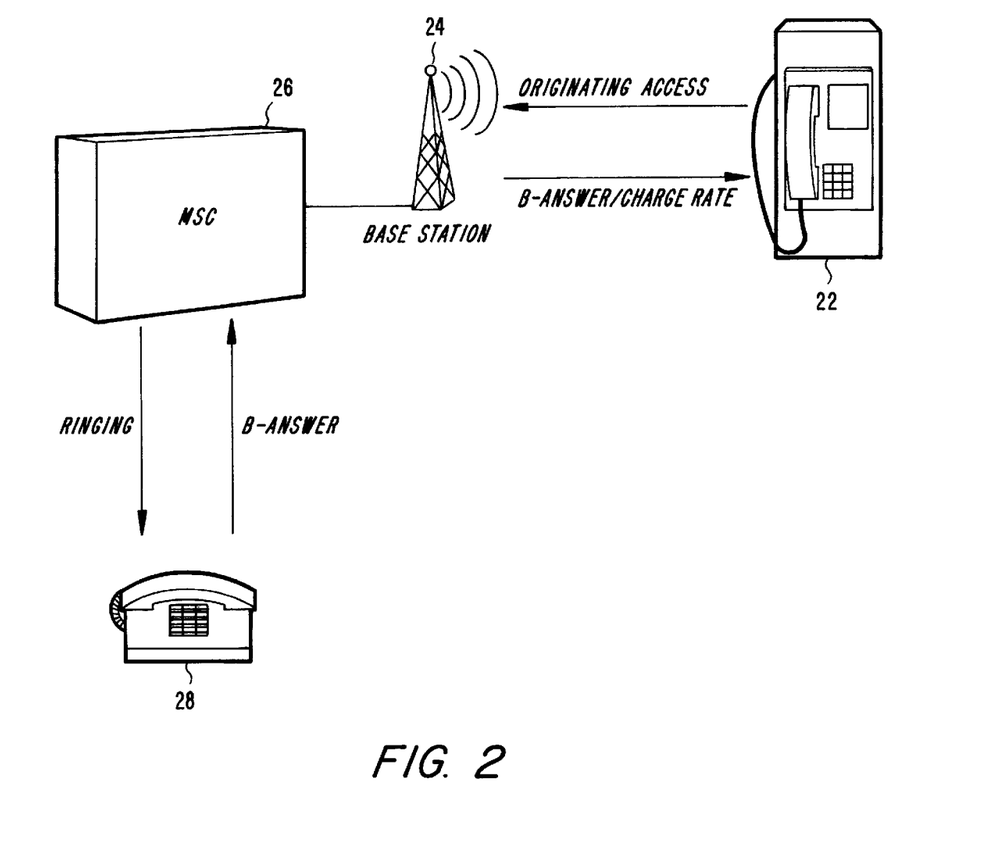
FIG. 2 illustrates a cellular communication system with cellular pay phones/debit phones according to one embodiment of the present invention.

FIG. 2 illustrates a cellular communication system with cellular pay phone/debit phone support according to one embodiment of the present invention. In FIG. 2, a pay phone/debit phone 22 communicates with a mobile switching center 26 via a base station 24 in the same manner as a conventional mobile station. The mobile switching center 26 can be connected to a variety of other communication systems like the fixed public telephone network so as to allow the user of the pay phone/debit phone 22 to contact any phone regardless of whether the phone is in the cellular system or not.

As noted above, mobile pay phones/debit phones like the ones illustrated in FIG. 2 may require the cellular system to send the pay phone/debit phone information regarding how much to charge the customer for each time unit that passes during the call. This is referred to as charge rate information.

The invention will be further described with reference to FIG. 3 which illustrates a flow chart for pay phone/debit phone support. In order to allow the MSC to distinguish regular phones from pay phones/debit phones, the pay phones/debit phones are assigned special codes when they are defined/activated in the MSC. In some systems, different types of phones are assigned to specific mobile charging (MCH) subscriber classes, e.g. MCH-0, MCH-1, etc. Thus, for example, a regular subscriber which does not need charge rate information can be assigned to subscriber class MCH-0 while pay phones/debit phones can be assigned to subscriber class MCH-2. The codes are stored in the MSC and can be referenced whenever a call is made.

Figure 3:
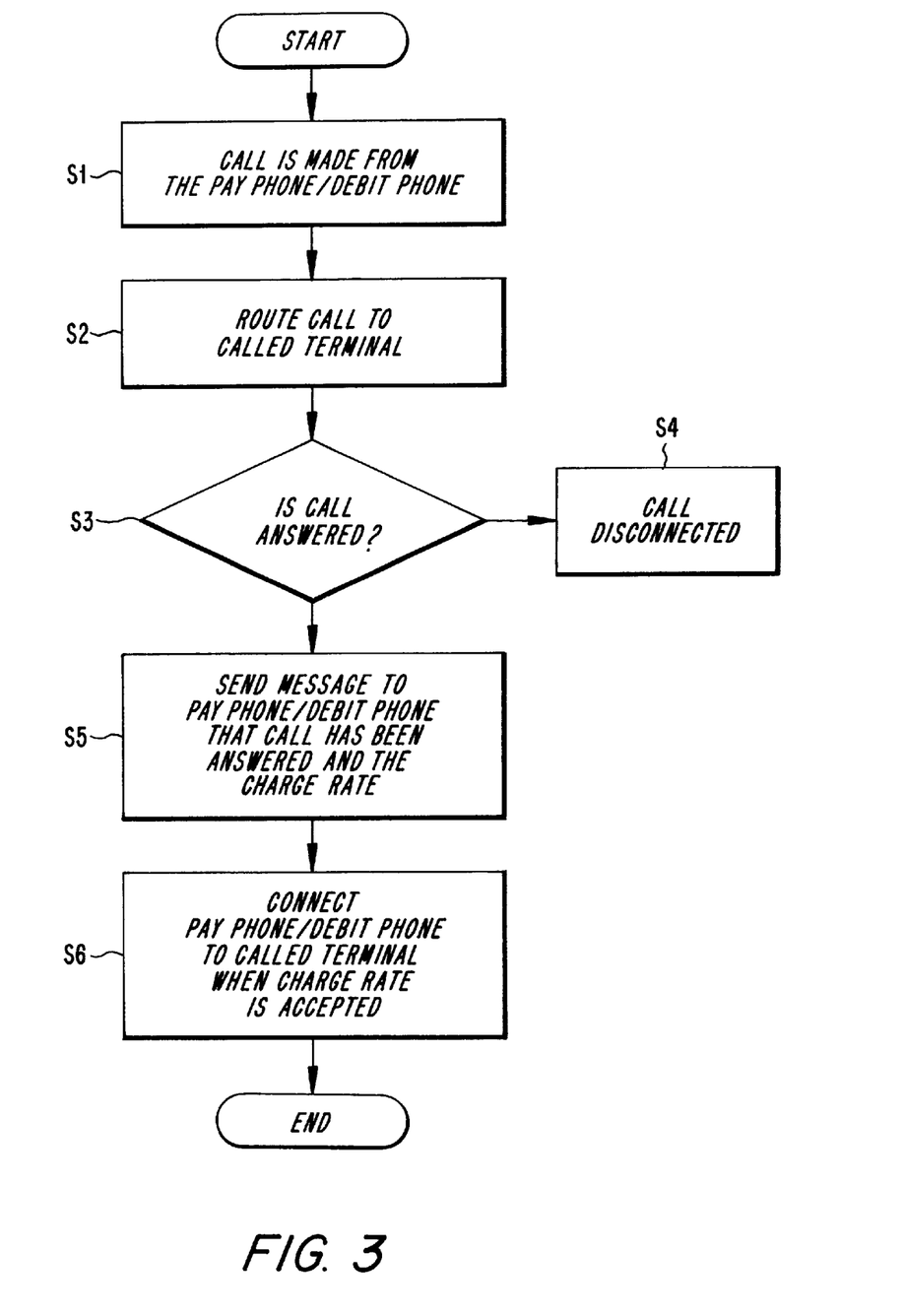
FIG. 3 is a flow chart illustrating cellular pay phone/debit phone support for Charge Rate Order.

When a call is made from the pay phone/debit phone in step S1 of FIG. 3, the base station receives the call request and forwards the call request to the MSC. The MSC then forwards the call to the called phone in a known manner in step S2. The MSC then detects whether or not the call is answered in step S3. If the call is not answered, the call is disconnected in step S4. However, if the call is answered, the MSC checks the pay phone/debit phone's mobile charging subscriber class and determines the charge rate that needs to be employed by the pay phone/debit phone. The MSC then sends a signal to the base station indicating that the call has been answered and what charge rate to use for the call. The base station then sends the charge rate information to the pay phone/debit phone using cellular air interface messages in step S5. The pay phone/debit phone is then connected to the called phone once the charge rate has been accepted in step S6.

Air interface messages have been designed to carry out specific functions or applications as set forth in various standards. In the present invention, in AMPS, the Mobile Station Authentication and Privacy messages are used in their standard manner for authentication and encryption purposes and in a non-standard manner to transmit the charge rate to the pay phones/debit phones. In TACS, the Mobile Station Control message is used in a standard manner for charge rate purposes except for five specific code values (FIG. 6) which are reserved for Authentication and Privacy as specified in AMPS.

Figure 4A:
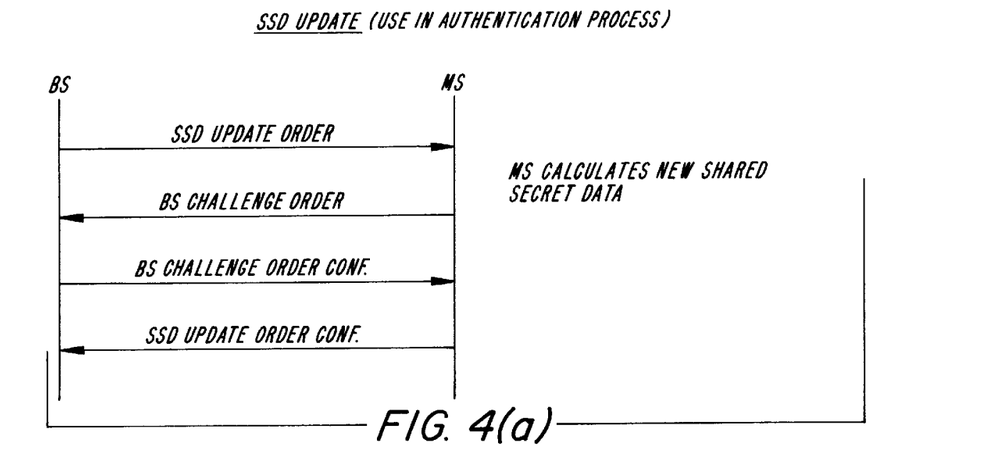
FIGS. 4(a)–(c) illustrate Authentication and Encryption enabling/disabling processes.
Figure 4B:
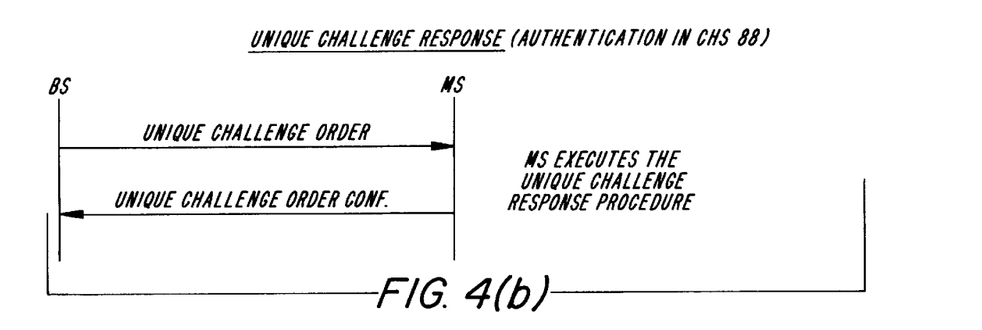
Figure 4C:
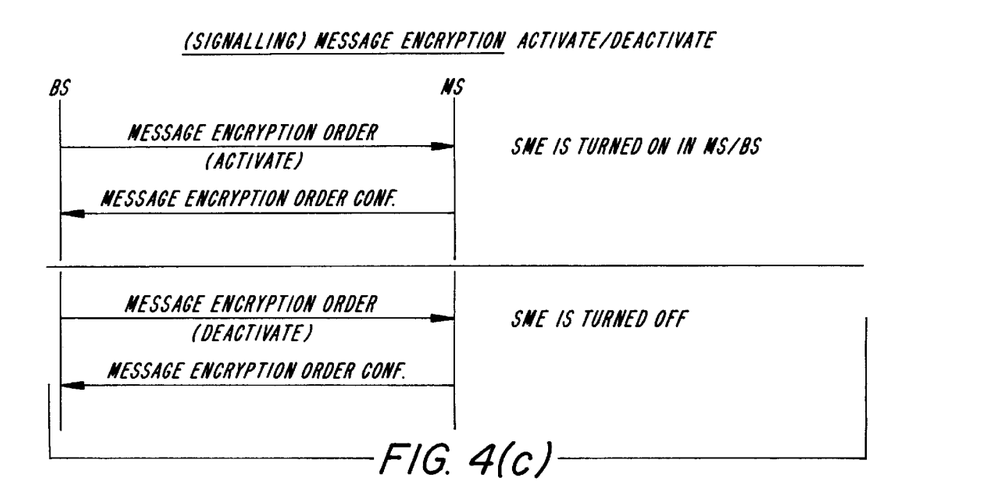

As illustrated in FIGS. 4(a)–(c), the authentication and encryption functions can be performed in several manners on the analog voice channel in several states: waiting for order; waiting for answer; and conversation. In FIG. 4(a), the Shared Secret Data (SSD) Update is used. SSD is a value that can only be calculated by the MSC and the specific MS and is used as a part of the Authentication procedure. First, the base station sends a SSD Update order to the mobile station. The mobile station calculates new Shared Secret Data and sends a base station challenge order to the base station. The base station confirms the base station challenge order and the mobile station sends a SSD Update order confirmation to the base station. In FIG. 4(b), a Unique Challenge Response which is another part of the Authentication procedure. When the base station issues a Unique Challenge order, the mobile station executes the Unique Challenge Response procedure and transmits a confirmation signal to the base station. In FIG. 4(c), the base station issues a Message Encryption Order to activate/deactivate encryption and the mobile station acknowledges the Message Encryption Order.

Figure 5:
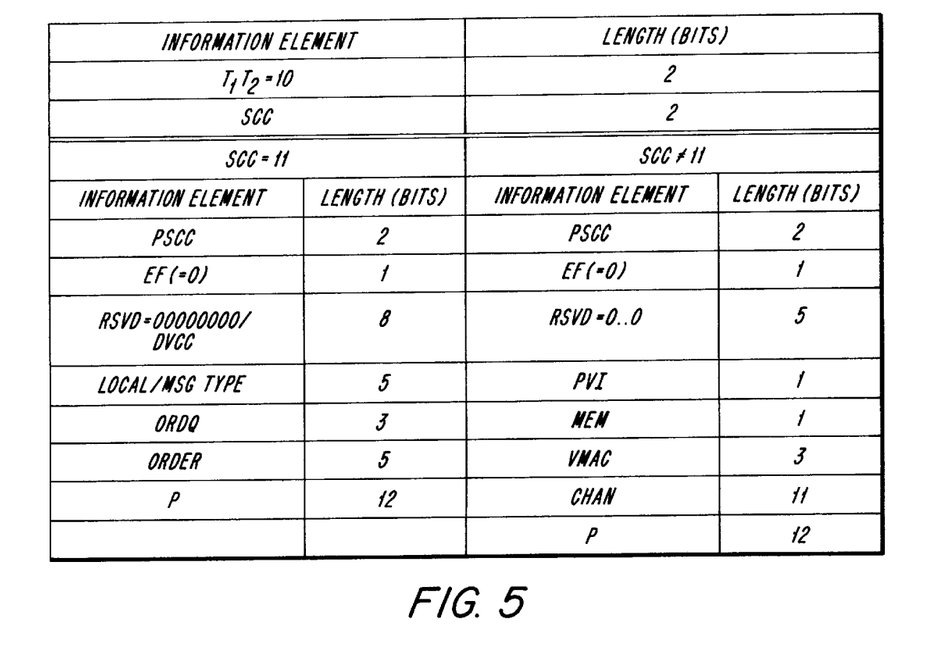
FIG. 5 illustrates the first word of a Mobile Station Control message which is used to decide which action is to be performed by the MS.
Figure 6:
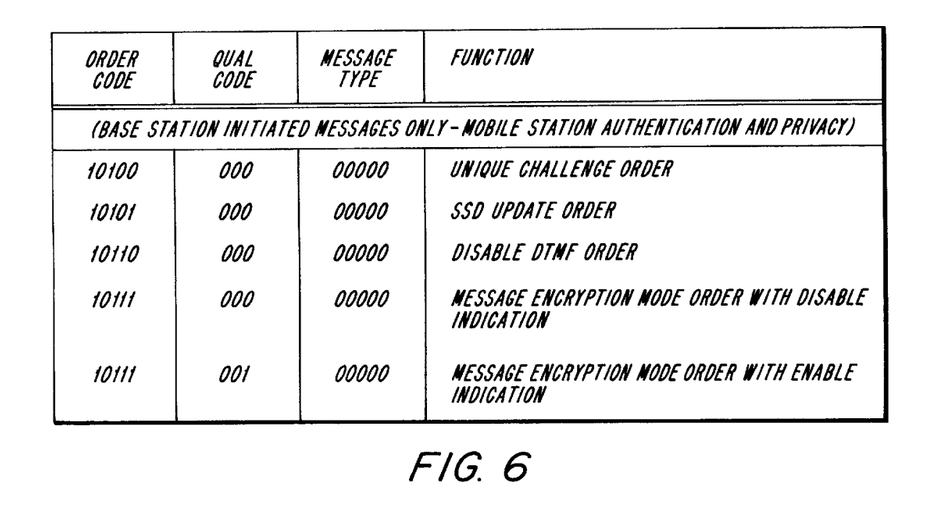
FIG. 6 illustrates the codes for the mobile station Authentication and Privacy procedures according to IS-136 which coincide with Charge Rate Order.
Figure 7:
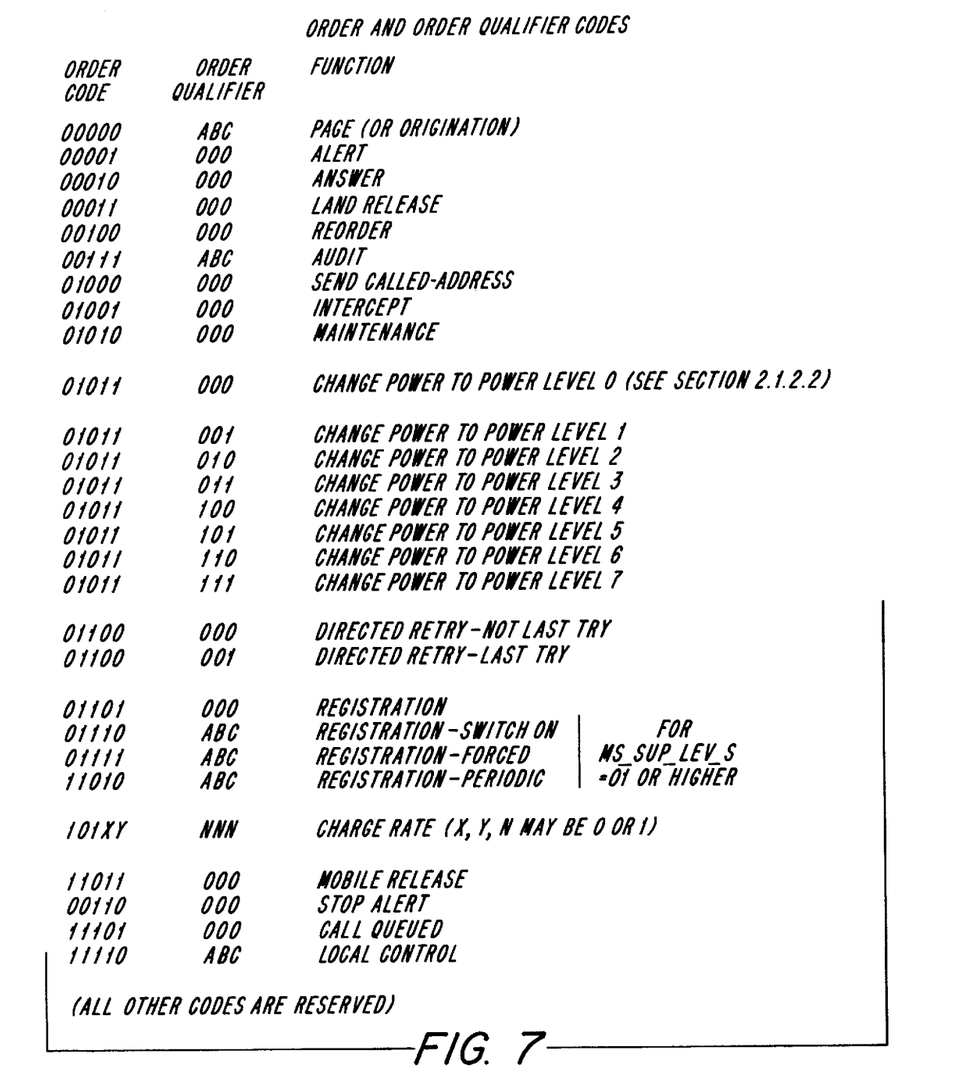
FIG. 7 illustrates, among other things, the codes for the mobile station Charge Rate Order procedure according to TACS.

The mobile station control message is used to order the mobile station to perform specific functions. The first word of the mobile station control message has a format which is illustrated in FIG. 5. The mobile station control message has a plurality of information elements such as an Order Code field, an Order Qualifier field and a Local/Message Type field. The Order Code field, the Order Qualifier field, and the Local/Message Type field identifies the message indicating a specific action. The Authentication process can use two of these code combinations, the message encryption process can use two of these code combinations and one code combination can be used in AMPS for disabling DTMF signalling. The Authentication and Privacy process refers to the action during which information is exchanged between a mobile station and a base station for the purpose of enabling the base station to confirm the identity of the mobile station (FIGS. 4a–b) or to enabling/disabling encryption (FIG. 4(c)) or disabling DTMF. The mobile station Authentication and Privacy order has specific Order Codes of 10100, 10101, 10110, and 10111 with the Qualifier Code of 000, and the Order Code of 10111 with the Qualifier Code of 001 as illustrated in FIG. 6. The different Authentication and Privacy Order Codes (e.g. 10100, 10101, 10110, and 10111) and the different Qualifier Codes (000, 001) and the Message Type (00000) are used to distinguish between the five different Authentication and Privacy procedures which the mobile station has been programmed to perform. FIG. 7 illustrates a table of Order Codes and Qualifier Codes and their associated functions.

Figure 8:
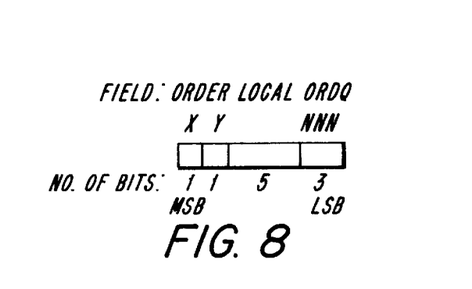
FIG. 8 illustrates a 10 bit charge rate qualifier word.

According to the present invention, charge rate information can be sent to the pay phones/debit phones using the codes specific for TACS CRO so long as the two least significant digits of the Order Code, the entire Qualifier Code and Local/Message type do not correspond to the two least significant digits of the Order Code, the entire Qualifier code and Local/Message Type assigned to the AMPS Authentication and Privacy process. As set forth in FIG. 6, the Local/Message Type is 00000 and the Qualifier Codes for all of the Authentication and Privacy messages are 000 and in one case 001. Thus, the charge rate information can be sent to the pay phones/debit phones using an order code (101XY) as long as the Order Code, Qualifier Code, and the Local/Message Type do not have one of the 5 values illustrated in FIG. 6. The bits XY of the Order Code and the bits in the Qualifier Code and the Local/Message Type are interpreted by the pay phone/debit phone as a charge rate information. For example, as illustrated in FIG. 8, the 10 bit charge rate qualifier word formed by the XY bits of the Order Code, the 5 bits of the Local/Message Type and the 3 bits of the Qualifier code can represent a number from 0 to 1023 and indicate the number of tenths of seconds purchased for one credit unit, wherein the value zero represents a free call.

There are several advantages with using existing air interface messages in a non-standard manner instead of implementing new messages to send the charge rate information to the pay phone/debit phone. First of all, developmental cost is lower since changes are only needed on an application level, while lower protocol levels do not need to be changed. In addition, as mentioned above, the base stations do not need to be upgraded only the MSC needs to be upgraded. Furthermore, the cost of the pay phone/debit phone is lower due to less processor load, less design complexity, and memory requirements. Finally, there is a lower battery consumption in the phones due to less processing being required.

It will be appreciated by those of ordinary skill in the art that the present invention can be embodied in other specific forms without departing from the spirit or central character thereof. The present disclosed embodiments are therefore considered to be illustrative and not restrictive. The scope of the invention is indicated by the appended claims rather than the foregoing description and all changes which come within the meaning and range of equivalents thereof are intended to be embraced therein.

What is claimed is:

1. A method for providing support for both Authentication and Privacy functions and sending charge rates for pay phones/debit phones in a communications system which sends control messages between base stations and said pay phones/debit phones on an analog channel, wherein each control message comprises an Order Code, a Qualifier Code and a Local/Message Type, comprising the steps of:

assigning a first group of combinations of Order Code, Qualifier Code and Local/Message Type to said Authentication and Privacy; and assigning a second group of combinations of Order Code, Qualifier Code and Local/Message Type to sending said charge rates, wherein said first and second groups are mutually exclusive.

2. A method for providing support for both Authentication and Privacy and sending charge rates according to claim 1, wherein said pay phones/debit phones interpret the two least significant digits in the Order Code and the entire Qualifier Code and Local/Message Type in said second group as a charge rate information.

3. A method for providing support for Authentication and Privacy fictions in a communications system which supports charge rate order functions using control messages in a standard manner on analog channels; wherein each control message contains an Order Code, a Qualifier Code and Local; comprising the steps of:

assigning a first group of combinations of Order Code, Qualifier Code and Local for transmitting charge rate information to pay phones/debit phones using said control messages in a standard manner; and assigning a second group of combinations of Order Code, Qualifier Code and Local for transmitting Authentication and Privacy information to said pay phones/debit phones using said control messages in a non-standard manner.

4. A method for providing support for Authentication and Privacy functions according to claim 3, wherein said pay phones/debit phones interpret the two least significant digits in said Order Code and the entire Qualifier Code and Local in said first group as a charge rate information.

5. A method for providing support for charge rate order functions in a communication system with pay phones/debit phones, said communication system also supporting Authentication and Privacy functions using control messages in a standard manner on analog channels, wherein each control message contains an Order Code, Qualifier Code and Local/Message Type, comprising the steps of:

assigning a first group of combinations of Order Code, Qualifier Code and Local/Message Type for transmitting Authentication and Privacy information to said pay phones/debit phones using said control messages in a standard manner; and assigning a second group of combinations of Order Code, Qualifier Code and Local/Message Type for transmitting charge rate information to said pay phones/debit phones using said control messages in a non-standard manner.

6. A method for providing support for charge rate order functions according to claim 5, wherein said pay phones/debit phones interpret two least significant digits in said Order Code and the entire Qualifier Code and Local/Message Type in said second group as a charge rate.

7. A communication system for providing support for both Authentication and Privacy functions and sending charge rates to pay phones/debit phones, comprising:

means for sending control messages between base stations and said pay phones/debit phones on an analog channel, wherein each control message comprises an Order Code, a Qualifier Code and a Local/Message Type;

means for assigning a first group of combinations of Order Code, Qualifier Code and Local/Message Type to said Authentication and Privacy; and means for assigning a second group of combinations of Order Code, Qualifier Code and Local/Message Type to sending said charge rates, wherein said first and second groups are mutually exclusive.

8. A method for providing support for both Authentication and Privacy functions and sending charge rates for pay phones/debit phones in a communications system which sends control messages between base stations and said pay phones/debit phones on an analog channel comprising the steps of:

assigning a first group of combinations of control codes to said Authentication and Privacy; and assigning a second group of combinations of control codes to sending said charge rates, wherein said first and second groups are mutually exclusive.

* * * * *